United States Patent
Wellen

(10) Patent No.: US 9,454,229 B1
(45) Date of Patent: Sep. 27, 2016

(54) METHOD AND DEVICE FOR TACTILELY READING TIME ON A TOUCH SCREEN

(71) Applicant: Alexander Wellen, Atlanta, GA (US)

(72) Inventor: Alexander Wellen, Atlanta, GA (US)

( * ) Notice: Subject to any disclaimer, the term of this patent is extended or adjusted under 35 U.S.C. 154(b) by 25 days.

(21) Appl. No.: 14/225,349

(22) Filed: Mar. 25, 2014

Related U.S. Application Data

(63) Continuation of application No. 13/861,228, filed on Apr. 11, 2013, now abandoned.

(51) Int. Cl.
*G06F 3/01* (2006.01)
*G06F 3/041* (2006.01)

(52) U.S. Cl.
CPC ............. *G06F 3/016* (2013.01); *G06F 3/0416* (2013.01)

(58) Field of Classification Search
None
See application file for complete search history.

(56) References Cited

U.S. PATENT DOCUMENTS

| | | |
|---|---|---|
| 360,641 A | 4/1887 | Adam |
| 365,032 A | 6/1887 | Von Wechmar |
| 1,222,369 A | 4/1917 | Dunchan |
| 2,091,146 A | 8/1937 | Hamilton |
| 2,168,314 A | 8/1939 | Blanks |
| 5,311,487 A | 5/1994 | Mininni et al. |
| 5,559,761 A | 9/1996 | Frenkel et al. |
| 6,052,339 A | 4/2000 | Frenkel et al. |
| 7,079,454 B2 | 7/2006 | Wellen |
| 2011/0210834 A1* | 9/2011 | Pasquero et al. .......... 340/407.1 |
| 2012/0319966 A1* | 12/2012 | Reynolds ....................... 345/173 |

OTHER PUBLICATIONS

Olivier Bau et al., "TeslaTouch: Electrovibration for Touch Surfaces", 10 pages, UIST, New York, Oct. 2010.
Touch Watch by Christopher Konings >> Yanko Design,www.yankodesign.com/2013/03/04/sneak-a-feel-at-the-time/, pp. 1-4, Mar. 2013.
John D. Sutter, When glass touch screens feel like sandpaper—CNN.com, http://www.cnn.com/2010/TECH/innovation/10/08/tesla.touch.disney/index.html?_s=PM:TECH, 2 pages, Oct. 2010.

* cited by examiner

*Primary Examiner* — Quan-Zhen Wang
*Assistant Examiner* — Chad Dicke
(74) *Attorney, Agent, or Firm* — Winston & Strawn LLP

(57) ABSTRACT

The present invention relates to a device and method that generates a tactile presentation, which indicates time on a mobile device. The mobile device may include a touch screen, a processor, and a means for generating electrovibrations. The touch screen may include the functionality to be activated to electrovibrate in at least one portion of the touch screen. The processor may receive electrical signals specifying and displaying a current time on the touch screen. The means for generating electrovibrations generates electrovibrations that vary in response to the time to provide the tactile presentation of the time on the touch screen. The touch screen typically includes a glass plate that is topped with a transparent electrode and insulator. The insulator may be operable to receive contact from a user's finger and in response, generate electrical impulses to provide a tactile presentation as haptic feedback to the user.

20 Claims, 7 Drawing Sheets

METHOD AND DEVICE FOR TACTILELY READING TIME ON A TOUCH SCREEN

CROSS-REFERENCE TO RELATED APPLICATIONS

This application is a continuation of U.S. application Ser. No. 13/861,228, filed Apr. 11, 2013, the entire content of this application which is expressly incorporated herein by reference.

FIELD OF THE INVENTION

The invention relates to a method of tactilely reading the time or the approximate time across a smooth surface or touch screen with little or no need to learn a complex new tactile code.

BACKGROUND OF THE INVENTION

Wrist and pocket watches have been developed that are readable by touch alone for the visually impaired or in the dark via a combination of protuberances, studs, projections, annular slots, discs and plates (U.S. Pat. Nos. 365,032, 360,641, 1,222,369 and 2,168,314). Other watches deliver time information by employing a silent vibration device (U.S. Pat. Nos. 5,559,761 and 6,052,339), square-areas, cursors, and symbolic codes (U.S. Pat. No. 5,311,487) and Braille (U.S. Pat. No. 2,091,146).

Other developments include timepieces that provide a readily interpretable tactile display of the time, preferably without requiring the user to learn a complex code and can easily be read by both a visually impaired or sighted person. U.S. Pat. No. 7,079,454 discloses a display comprises a display area and at least one moveable portion within the display. The moveable portion is moveable with respect to the display to form at least one displayed character that is recognizable by touch by a user and has a tactilely detectable shape that is independent of a system of dots. Others in the industry are exploring ways to use magnetized ball bearings to represent the hour and minute hands of a watch.

More and more, however, individuals are routinely obtaining the time not via a physical wristwatch or timepiece but rather a digital consumer device, particularly mobile devices. Meanwhile, the field of haptics technology or tactile feedback technology has advanced significantly in recent years enabling an individual to touch a smooth surface or touch screen interface and experience the sensation of touching a physical object. In the past, a tool or stylus was required to reproduce the simulation, but now haptic textures can be read via an individual's finger or fingertips. Devices can now record the force, speed, acceleration, vibrations, and motions of a user in connection with a real object and those attributes can then be used to simulate or recreate the tactile sensation of touching that object through electromechanical or electromagnetic actuators, electrovibrations or reverse -electrovibrations, and other haptic technology. For example, Disney's TeslaTouch uses electrovibrations such that "when a finger is placed on the surface of the touch panel, a periodic motion of the electrical charges is induced in the tip of the finger. This results in a periodic attraction force between the finger and the panel modifying the friction between the sliding finger and the panel and thus producing a sensation of tactile texture."

A method is needed that can provided a sighted or visually impaired person the ability to tactilely read the time or the approximate time on a smooth surface or touch screen readily.

SUMMARY OF THE INVENTION

According to the principles of the invention, a device for generating a tactile presentation which indicates time on a mobile device is provided, the device including a touch screen, a processor and means for generating electrovibrations. The touch screen includes functionality to be able to be activated to electrovibrate in at least one portion of the touch screen. The processor receives electrical signals specifying a current time and displaying the current time on the touch screen. The means for generating electrovibrations, generates electrovibrations that vary in response to the current time to provide the tactile presentation of the current time on the touch screen. In one embodiment, the touch screen is configured to include a glass plate that is topped with a transparent electrode and an insulator. The insulator is operable to receive contact from a user's finger. In response to the contact of the user's finger, the insulator generates electrical impulses to provide a tactile presentation as haptic feedback to the user.

Also, the mobile device may be a mobile communications device. Advantageously, the mobile device is a smartphone. A smart phone is a mobile phone built on a mobile operating system, with more advanced computing capability connectivity than a feature phone. Examples of smartphones are iPhone, Android, Windows, Blackberry, etc. A smartphone also has the ability to execute and display mobile applications. Further, the mobile device may be any number of devices such as an iPod, a watch, a digital coin, a computing device, a digital music player, a PDA, tablet computing device, etc.

Generally, the tactile representation of the current time includes at least one of the following: a clock, numbers, symbols, shapes, or characters. For example, the tactile representation of the current time may be represented as a combination of numbers, letters, and characters, such as 11:05 PM. The current time may also include different clock faces and aspects, such as hour hands, minute hands, hour and minute place holders, etc. The current time may also be represented by different symbols or shapes, such as triangles, circles, squares, etc. The current time may also be represented by different characters, such as letters or other characters.

In a preferred embodiment, the tactile presentation of the current time is displayed with respect to the orientation of the phone. For example, if the phone is upside down, the tactile presentation of the current time may be presented to the user in the correct orientation so as to appear right side up. Also, if the phone is turned on either side, the tactile representation of the current time will be presented to the user in right side up. Alternatively, the user can lock the orientation of the phone or device.

It is also possible for the tactile presentation of the current time to be activated when desired by pressure to or rubbing a portion of the touch screen. The mobile device may include sensors or other sensory devices that detects pressure or friction and is responsive to such pressure or friction by activating the tactile functionality of the touch screen. The mobile device would then communicate the tactile presentation of the current time for the user. This embodiment avoids battery drain or other inefficiencies in operation that could be present if the tactile functionality was continually active on the touch screen. Another embodiment includes pressing a button to activate the tactile presentation of the current time.

While the invention is fully operable when only the minutes of the day are displayed tactilely, it is preferred to indicate the current time in both hour and minutes of the day so that a user of the touch screen can determine the exact time of day without having to view the screen.

Another embodiment of the invention is a method that generates a tactile presentation that indicates time on a mobile device. The method includes providing a mobile device that is operated by a touch screen, receiving electrical signals specifying a current time on the touch screen, and generating electrovibrations that vary in response to the current time to provide the tactile presentation of the current time. The touch screen includes functionality to be able to be activated to electrovibrate in at least a portion of the touch screen. In one embodiment, the electrovibrations are achieved by configuring the touch screen to include a glass plate that is topped with a transparent electrode and an insulator. When the insulator is contacted by a user's finger, electrical impulses are generating to provide the tactile presentation as haptic feedback to the user. In one embodiment, the mobile device is a tablet computing device. Another embodiment includes where the current time is an indication of the minutes of the day so that a user of the touch screen can determine the time elapsed within an hour without having to view the touch screen.

BRIEF DESCRIPTION OF THE DRAWINGS

Elements of the preferred embodiments below can be mixed and matched.

DETAILED DESCRIPTION OF THE PREFERRED EMBODIMENTS

The present method and device will be described in connection with the figures, it being understood that the description and figures are for illustrative, non-limiting purposes.

Figure 1:
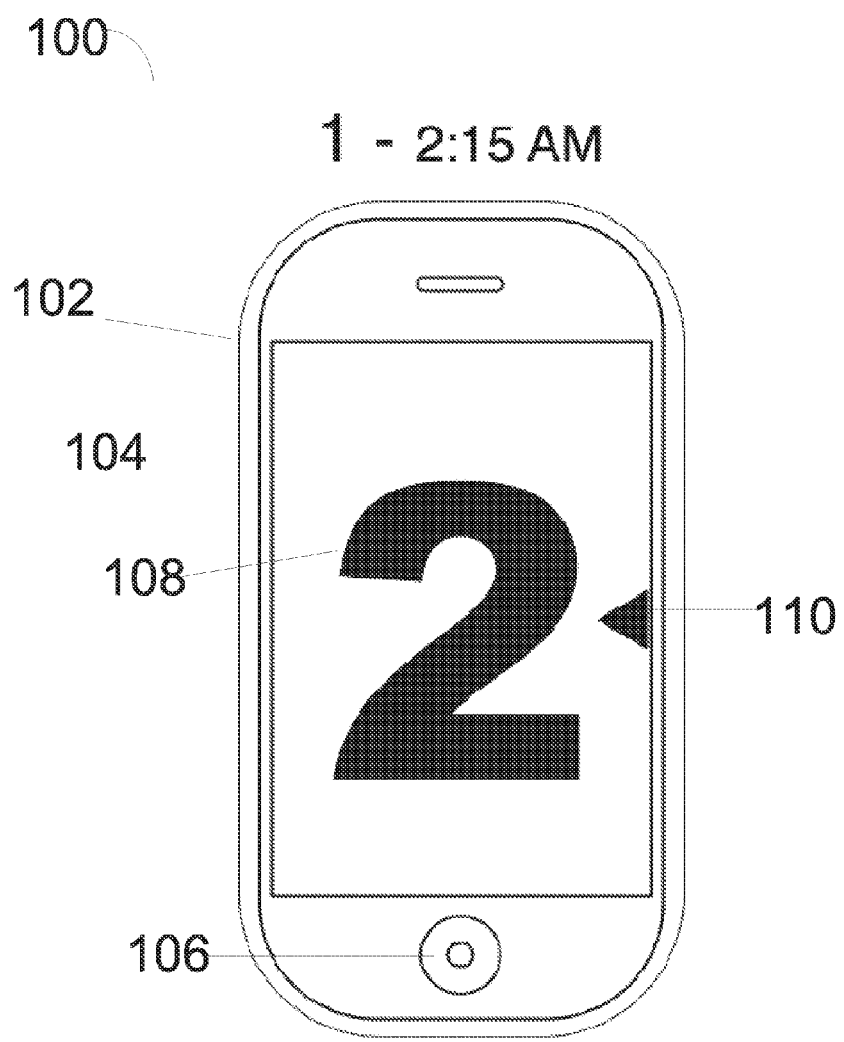
FIG. 1 is a front view of an exemplary embodiment that shows a mobile device with the hour largely displayed tactilely above or below the surface and the minutes around the edge of the edges of the touch screen display consistent with the position of an analog clock.

With reference to FIG. 1, illustrated is an exemplary device for generating a tactile presentation that indicates time. FIG. 1 illustrates a front view 100 of an exemplary embodiment that shows a mobile device 102 with the hour 108 largely displayed tactilely above or below the surface or touch screen 104 and the minutes 110 around the edge of the edges of the touch screen display 104 consistent with the position of an analog clock. It should be appreciated that the mobile device is customizable. The user may have a multitude of choices and options on how the tactile presentation is displayed, etc.

The mobile device 102 may also include a button 106. Button 106 may be used for a variety of purposes for operation of the mobile device. In the example of the present invention, button 106 may be used to activate the tactile presentation of the current time. In another embodiment, the user may apply pressure to the touch screen 104 to activate the tactile presentation. Allowing the tactile presentation to remain dormant unless activated is an important battery saving feature that is key for mobile devices. Usually mobile devices run on batteries and energy saving techniques is desirable.

In one embodiment, the mobile device is in a locked state. A locked state indicates that no touching or contact of the touch screen will activate actions or buttons of the device, other than designated buttons or actions. Therefore, if the device is in a locked state, it may be easier to determine if a user wishes to activate the tactile presentation and easier for the user to tactilely read the presentation without triggering other actions or response. Although, it is not required for the mobile device to include a locked state or to be in a locked state for the tactile presentation to be read.

It should be appreciated that the hour 108 may be displayed in multiple different formats, such as shapes or other characters. In this example, the hour 108 displays a '2' indicating that the hour is 2:00. Also, the minutes 110 in this exemplary example is represented by a triangle. It should be appreciated that the minutes 110 may also be represented by other shapes, characters, numbers, symbols, etc. Also, hour 108 and minutes 110 are not limited to the positions on the touch screen 104 illustrated in view 100. For example, minutes 110 is currently in the "quarter" or ':15' position, but the minutes 110 may also be in the "half" or ":30" position, and so on. Also, the minutes 110 may also be more specific than just the "quarter" or "half" of a clock face. For example, the minutes 110 may appear at the ":20" or ":50" position. For this example, it is assumed the user would intuitively know whether it was AM or PM. Although, view 100 could include an additional indicator that indicates whether it is AM or PM.

When the tactile presentation of the current time is activated, it provides a user the ability tactilely read the current time or approximate time across a smooth surface or touch screen interface 104 by any person, sighted or visually impaired, preferably without learning any substantial code system. The display or surface 104, flat or curved, can be of any size or shape, but is particularly useful on mobile devices that are operated using a touch screen. The ability to tactilely read the current time may be useful in situations where there is low light or the user does not wish to draw attention to themselves by checking the time.

The tactile presentation may include at least one displayed character that simply represents the hour and/or minutes. The tactile presentation can be easily read tactilely by moving a finger or fingers across the displayed character(s). The displayed character(s) is recognizable by touch by a user's finger as if it were slightly raised, elevated or slightly depressed from the touch screen surface. On a digital display or touch screen, the displayed character(s) can be skeuomorphically represented as a digital or analog clock or through a tactically sensible shape that is independent of a interpretation system based on dots or Braille. For example, the shape is neither a Braille character nor the shape of several dots that need to be added together or that form a certain dot-dash arrangement that would need to be interpreted to obtain what number it represents.

The tactile presentation provides a small static force to control friction between a user's finger and the touch screen. The frequency of the vibration and the touch screen is carefully tuned so that the tactile presentation can actually create the feeling of a texture to a user's finger on a smooth, glass-like surface. This is referred to as "haptic feedback," which is defined as impulses that stimulate the sense of touch. Small electronic impulses are used to create a push and pull between a person's fingertip and the touch screen. Haptic feedback is a tactile feedback technology which takes advantage of the sense of touch by applying forces, vibrations, or motions to the user. The electrovibrations that may ultimately result in the tactile feedback being achieved by forces, vibrations or motion.

For example, a touch screen 104 may include three layers: a glass plate, a transparent electrode and an insulator. To simulate friction and texture, the electrode creates small electrical fields in the insulation layer. These fields oscillate between positive and negative charges, which create the sensation of friction and texture on the touch screen surface.

In order to activate the tactile presentation, the transparent electrode layer is excited with a periodic electrical signal applied to the connectors normally used by a position-sensing driver. A position-sensing driver indicates the position being activated by touch on the touch screen. When an input signal of sufficient amplitude is provided, an electrically induced attractive force develops between a user's finger and the underlying electrode of the transparent electrode layer. This increases the dynamic friction between the finger and the panel surface (or touch screen) and, this causes the feeling of an object on the touch screen.

Examples of the displayed character(s) are geometrical or belongings to a traditionally sight-based alphanumeric system. The different characters can comprise Arabic numbers, Latin letters, or other letters and numbers from a visual writing or numerical system. The different characters can also comprise geometric shapes that are distinguishable by finger touch, and the preferred geometrical shapes have less than eight sides to facilitate interpretation by an unskilled user.

The displayed character(s) can comprise one of a group of different characters representing preselected times kept by the clock device and one embodiment of the displayed character can be configured to be identified by the user based on its orientation and discrete position in the display area. The preferred characters to be used, however, are configured to be identified by their shape, preferably regardless of their position or orientation. At least two different characters would work but at least five different characters allows for an easier and quicker read. To facilitate interpretation by an untrained user, the shape is preferably sufficiently large to be readily determined by touch and identified as a recognizable and familiar character by a normally-sighted user.

In one embodiment, the shape of the moveable portions can otherwise be circles, triangles, or other shapes that are readily employable together to cooperatively form the desired displayed character(s). At least some or all of the characters can be displayed on substantially the same location in the display area. The displayed characters can all comprise a single digit or shape, or alternatively multiple digits or shapes. Also, the size of the character(s) may vary. It may be an option that a user selects how large or small the tactile presentation is to be displayed.

In another embodiment, a gyroscope, accelerometer, and/or compass as part of a mobile device may be utilized. Utilizing theses components can take into account the orientation of the device to establish precise and reliable method and position to tactilely read the time. For example, the time would be upright and readable regardless of how the individual placed the mobile device in their pocket, user touches, slides, or applies pressure, force, or friction to the surface once or repeatedly with a finger or fingers in one area of the touch screen to cause the displayed time to appear and be easily read tactilely underneath or somewhere on the touch screen. Alternatively, the user can lock the orientation of the smooth surface or touch screen to create a consistent readability.

In one embodiment, the location of the displayed time on the smooth surface or touch screen appears where the user touches, rubs, or applies pressure to the surface. For example, if the user reaches into his or her pocket, the tactile time appears, is sized, and/or is properly oriented and readable wherever the person presses, rolls, or slides his or her finger or fingertips across the surface.

In another embodiment, the displayed character or characters are generally pie-shaped and arranged generally around a central point on the display such that the height of at least one of the moveable portions is changed with respect to the others to indicate the general analog clock position corresponding to the time kept on the clock device. Each displayed portion in this embodiment can be at a fixed lateral location in the face of the watch, but change elevates between at least two elevation positions.

The displayed characters can represent at least each of the hours in a 12- or 24-hour period. In one embodiment, up to ten different characters are used, and a separate indicator can be used to indicate, separately or in combination with the displayed character, the remaining hours or other time periods of the clock. Another displayed character can also be used to represent different fractions of an hour. The moveable portions that form at least one of the different characters should be sufficiently close together that any spacing therebetween is substantially undetectable by touch with a human finger-pad or at least easily distinguishable from other protrusions not associated with the character. In another embodiment, the moveable portions are arranged as a seven-segment display, such as a typical digital display found on a digital wristwatch, but operating to be read tactilely instead of by sight.

The characters can also represent at least the minutes in a given hour. In one embodiment, only the minutes are represented boldly and clearly on the touch screen to indicate how many minutes have passed in the hour without representation of hour—this embodiment assumes the users is aware of the hour and simply needs the precision associated with the minutes. This embodiment is illustrated and described in more detail herein.

The device can also include an indicator portion that feels tactilely elevated or below the surface of the display to indicate the further information relevant to the current time in combination with the displayed character. The indicator can comprise a plurality of indicators, each with a position that in conjunction with the displayed character indicates the current time that is kept on the device. The plurality of indicators can be disposed around the display area in one embodiment, and in another embodiment an indicator is moveable by an actuator along a path to more precisely indicate the time kept on the device in combination with the displayed character.

Figure 2:
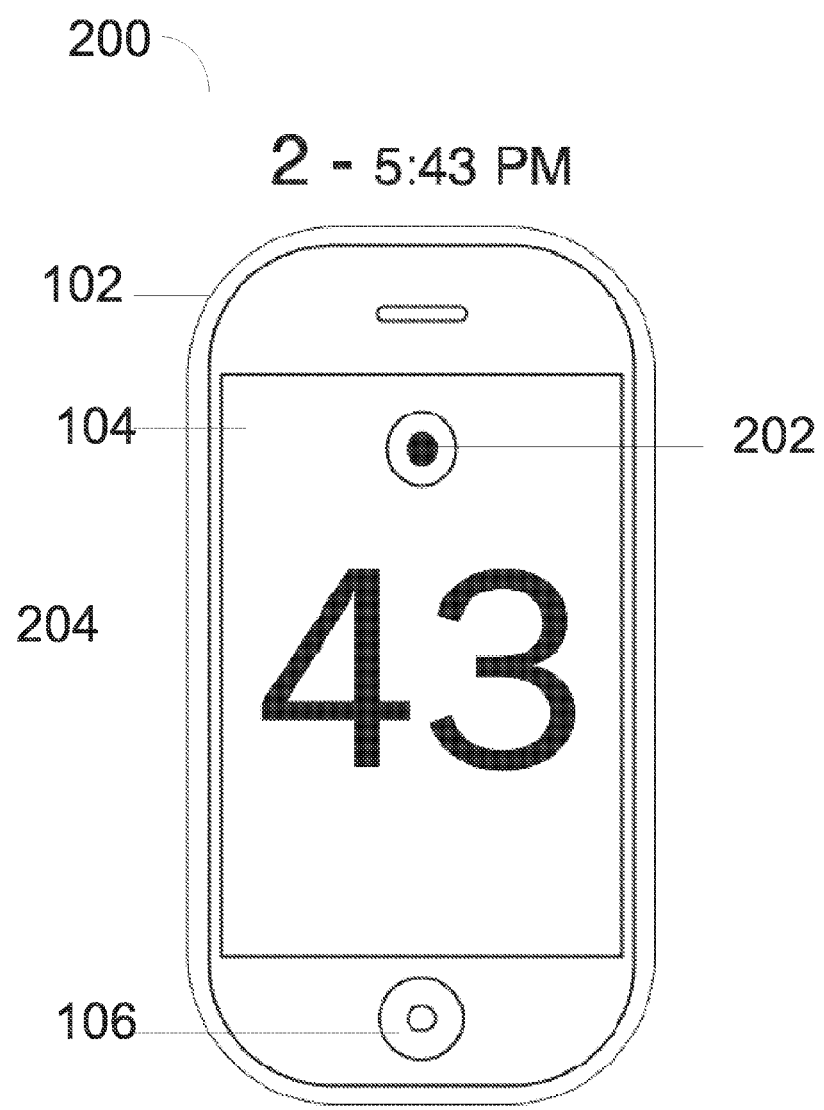
FIG. 2 is a front view of an exemplary embodiment that shows only the minutes largely displayed tactilely on the touch screen of a mobile device.

Now referring to FIG. 2, which is a front view 200 of an exemplary embodiment that shows only the minutes 204 largely displayed tactilely on the touch screen 104 of a mobile device 102. In this example, the minutes 204 indicate that it is 43 minutes past the hour. Usually, a user would know the hour of the current time but might not always know the minutes or approximate minutes of the current hour. This embodiment also includes an indicator 202, which may represent the hour, AM/PM, etc. It should also be appreciated that indicator 202 may be optional and is not required. Also, indicator 202 may appear in multiple different formats. For example, indicator 202 may be any number, shape, character, or symbol. In one embodiment, the indicator 202 toggles whether the orientation of the phone is locked or unlocked. Indicator 202 and minutes 204 are not limited to the current position displayed in the view 200. The position of indicator 202 may also represent information about the current time.

Figure 3:
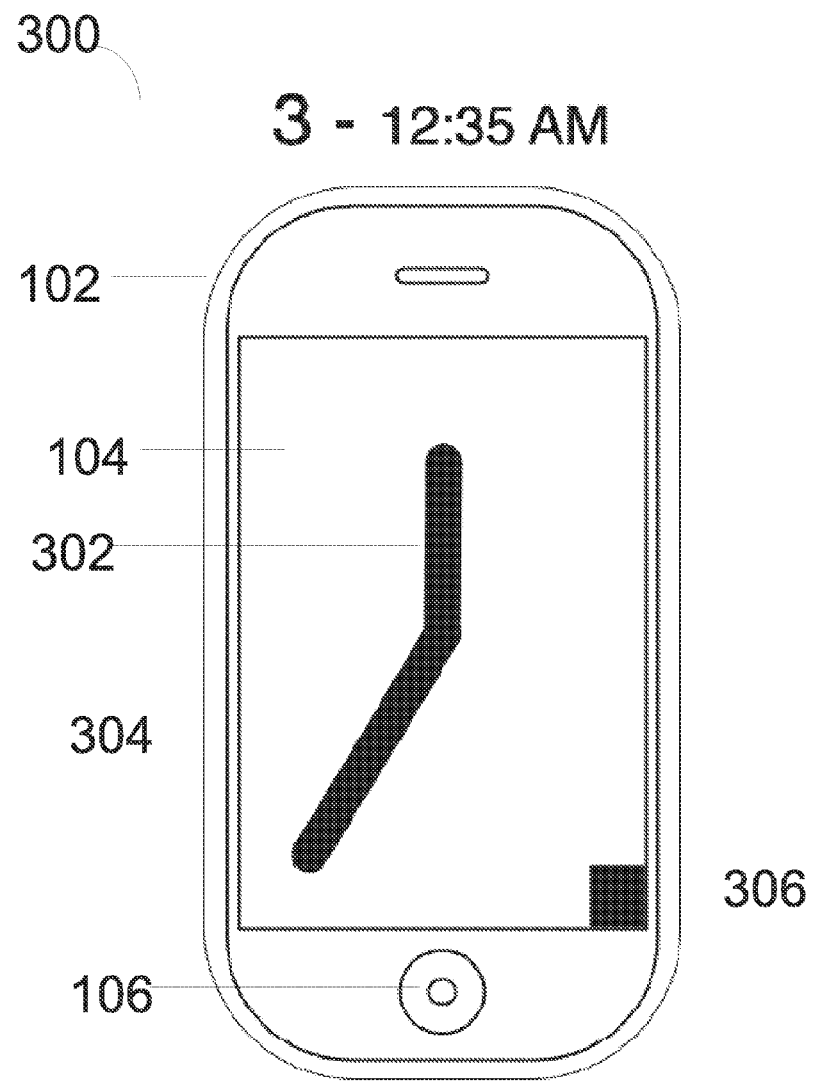
FIG. 3 is a front view of an exemplary embodiment of a mobile device that shows the skeumorphic of an analog clock that is tactile.

Now referring to FIG. 3, which is a front view 300 of an exemplary embodiment of a mobile device 102 that shows the skeumorphic of an analog clock. View 300 includes a mobile device 102, a touch screen 104, a button 106, an hour hand 302, a minute hand 304, and an AM/PM indicator 306. The hour hand 302 and the minute hand 304 shows the skeumorphic of an analog clock. In this example, the hour hand 302 and the minute hand 304 indicate that the current time is 12:35 AM. The AM/PM indicator 306 may appear on the touch screen 104 in any number of places to indicate the difference between AM or PM. The AM/PM indicator 306 may also be represented by any number of shapes, symbols, characters, etc. In this example, the AM/PM indicator 306 indicates AM but the AM/PM indicator may be customized. Also, the AM/PM indicator 306 is optional.

Figure 4:
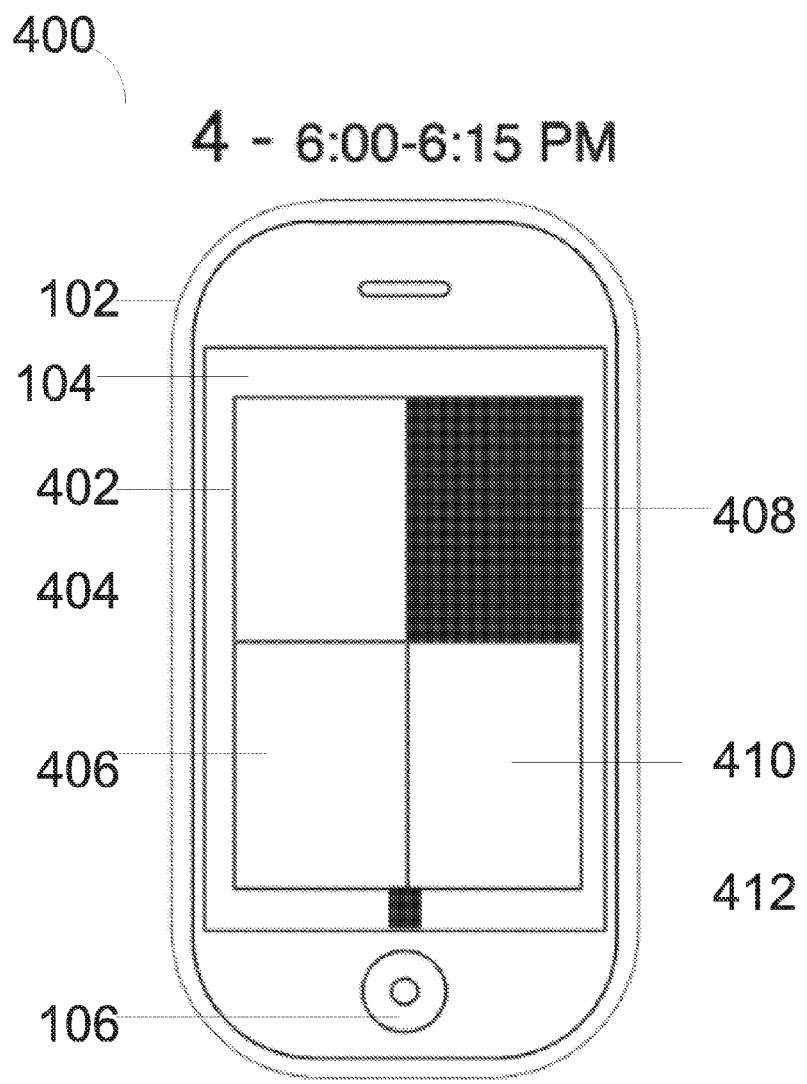
FIG. 4 is a front view of an exemplary embodiment of a mobile device that shows the hour raised or depressed as a small tactile square at the lower center or six o'clock position and with a large raised (or depressed) square in upper right to approximate minutes.

Now referring to FIG. 4, which is a front view 400 of an exemplary embodiment of a mobile device 102 that shows the hour 412 as a small tactile square at the lower center or six o'clock position of the touch screen 104 and with a large raised (or depressed) square 408 in upper right to approximate minutes. The view 400 illustrates a quadrant system 402 to indicate approximate time. For example, square 408 may represent the minutes of the hour from ":00" to ":14." Square 410 may represent the minutes of the hour from "0:15" to "0:29." Square 406 may represent the minutes of the hour from ":30" to ":44." Square 404 may represent the minutes of the hour from ":45" to ":59." The quadrant system 402 may be organized in a variety of different methods and using a variety of different shapes to illustrate. In this example, the current time is between 6:00 and 6:15 PM. This can be used when knowing the precise time is not as important as determining elapsed time as each change in the square represents the passing of a quarter hour rather than the passing of a minute as shown in other embodiments. Of course, the shape of the segment can represent any particular time segment, e.g., two segments for 30 minutes, three for 20 minutes, six for 10 minutes, 10 for six minutes, etc.

The hour 412 represents the current hour of the day. It should be appreciated that the hour 412 may be represented by any number of shapes, symbols, characters, etc. Also, the hour 412 mays appear in multiple different positions on the touch screen 104. The hour 412 may also be optional.

It is also possible to utilize positions around the perimeter of the touch screen to represent hours. For example, the midpoint of each side can represent the 3 o'clock, 6 o'clock, 9 o'clock and 12 o'clock positions. Alternatively, each ⅓ of the distance of a side of the perimeter of the touch screen face can be used to define a point which can represent one of the hours of the day, so four sides provides 12 points which represent 1 to 12 o'clock respectively. The hour can be indicated by activation of the particular point. The position of the points can mimic a traditional clock or they can be arranged to a particular coding, e.g., starting with 1 in one corner and the increasing with movement sequentially around the perimeter. Of course a skilled artisan can envision many variations on this that would be effective.

Figure 5:
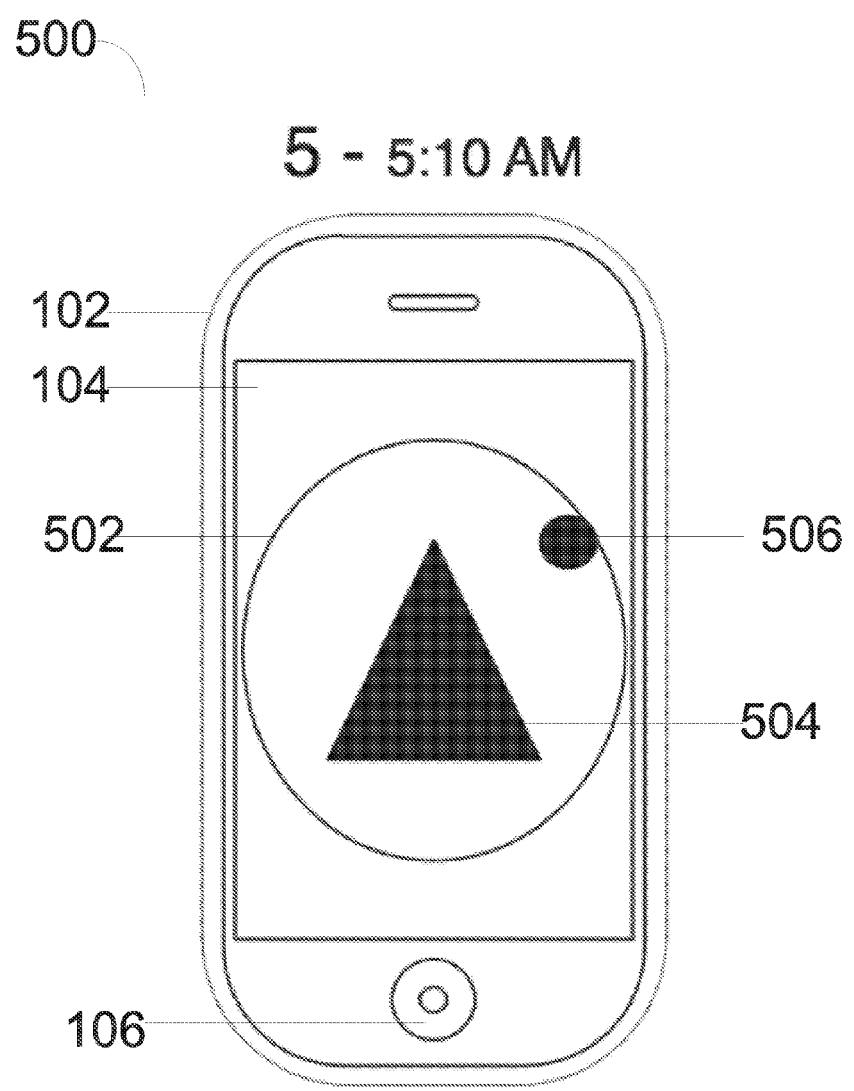
FIG. 5 is a front view of an exemplary embodiment of a mobile device that shows the hour as a large tactile triangle in the center of the touch screen with the minutes represented by a small tactile circle that orbits around the circumference or watch face.

Now referring to FIG. 5, which is a front view 500 of an exemplary embodiment of a mobile device 102 that shows the hour 504 as a large tactile triangle in the center of the touch screen 104 with the minutes 506 represented by a small tactile circle that orbits around the circumference or watch face 502. The hour 504 may be represented by a different shape for each number or only for some numbers because of the difficulty to tactilely read certain numbers such as 2, 5, etc. It should also be appreciated that view 500 may also be used with any combination of numbers, letters, shapes and characters for the hour 504 and minutes 506. The minute 506 may move along the circumference or watch face 502 to represent minutes for the current time. In this example, the current time is 5:10 AM.

To further distinguish the tactile feel of the hour 504 from the minutes 506, the mobile device 102 may vibrate to indicate which portion of the touch screen 104 is currently being touched. For example, if no portion of the tactile presentation is being touched, then no vibration. If the hour 504 portion is being touched, then a single or slow vibration. If the minute 506 portion is being touched, then may be double vibration or a quick repetitive vibration. The vibration may be an option for a new user of the tactile presentation, to get used to tactilely reading the current time. The correlation of portions of the touch screen and the corresponding vibration is merely an example and the present invention is not limited to only this example.

Figure 6:
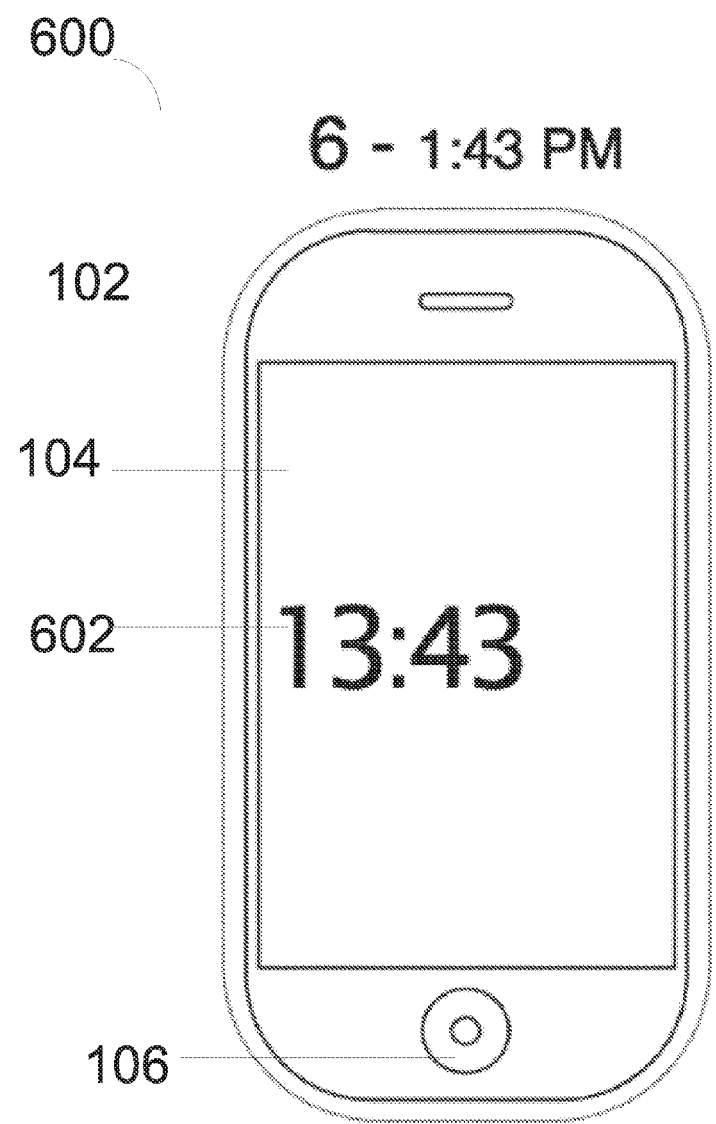
FIG. 6 is a front view of an exemplary embodiment of a mobile device that shows a tactilely readable digital display.

Now referring to FIG. 6, which is a front view 600 of an exemplary embodiment of a mobile device 102 that shows a tactilely readable digital display 602. View 600 illustrates a simplified view of the present invention with displaying a digital display 602 of the current time. It should be appreciated that the digital display 602 may appear in any position on the touch screen 104. In this example, the current time is 13:43 or 1:43 PM. Of course, it may not be necessary to indicate whether it is AM or PM as the user of the mobile device would generally know whether it is day or night.

The mobile device may include one or more mobile applications. The generation of the tactile presentation of the current time may be implemented by the mobile device and software running on the mobile device and any combination thereof. The mobile applications, hand-held or mobile devices, or other discrete software or hardware components can communicate and are arranged to carry out the illustrative processes and applications described herein by way of sending a signal such as a packet, digital message, or a command within a communication to or between components (and act in response to the receipt of a signal to carry our processes) and between or through supporting software or hardware such as communicating with an operating system, communicating with another resident application through an API or the like, communicating between network elements using an Internet protocol or one or more layers of the OSI model, or communicating through an intermediate component. The current time may be obtained from the mobile device or periodically checked through the Internet for accuracy.

Figure 7:
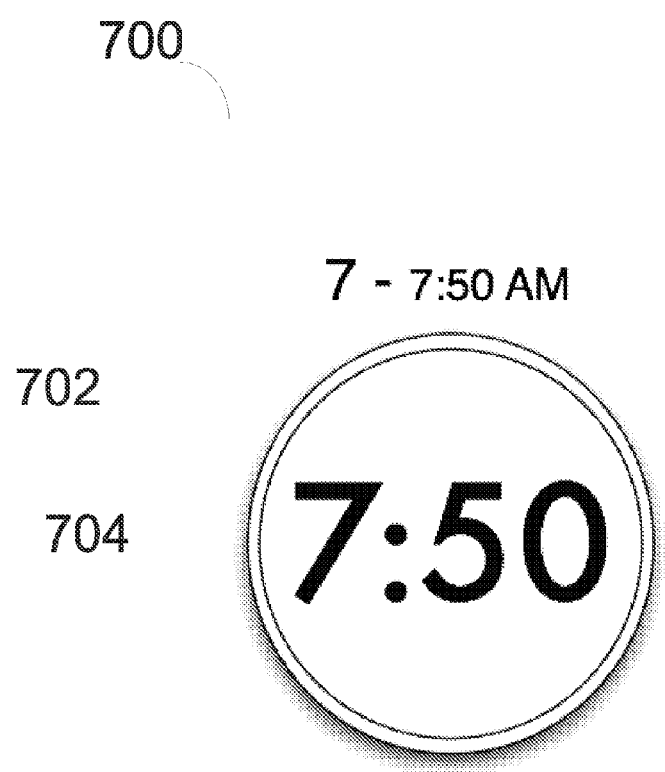
FIG. 7 is a front view of an exemplary embodiment of a digital coin that shows a tactile readable digital display.

Now referring to FIG. 7, which is a front view 700 of an exemplary embodiment of a digital coin 702 that shows a tactilely readable digital display 704. A digital coin is an example of another example of a mobile device. In one embodiment, the digital coin is a relatively smooth or flat physical coin that can be stored within a user's pocket and the digital coin may include the functionality to tactilely display the current or approximate time. The digital coin 702 may be powered in a variety of different ways including, but not limited to, batteries, AC adapter, etc. The digital coin 702 may provide the ability for a user to reach into his pocket and feel the time on either side of the digital coin 702. It should be appreciated that the digital coin 702 may also have many other functions and utilities.

View 700 illustrates a simplified view of the present invention with displaying a digital display 704 of the current time. It should be appreciated that the digital display 704 may appear in any position within the digital coin 702. The present invention is not limited to only this example. In this example, the current time is 7:50 AM. Of course, it may not be necessary to indicate whether it is AM or PM as the user of the mobile device would generally know whether it is day or night. Alternatively, view 700 may also include an indicator (not shown) that indicates to the user whether the current time is AM or PM.

In a further embodiment, the present invention can be incorporated into other electronic devices that do not have a screen but do have a surface that can be contacted in the same or a similar manner. Thus would include a watch cover or face that has at least some area that can be provided with the functionality to be able to be activated to electrovibrate or provide other tactilely perceptible forces in at least one portion thereof so that the use can determine the time by feel without having to look at the watch face or casing. For example, the crystal cover can be provided with a peripheral area with the necessary functionality that provides the desired forces as the user runs his or her finger along its circumference in accordance with the principles disclosed herein. The same is possible with an exposed watch face that has smooth portions that can be contacted to tactilely determine the time as disclosed herein.

The mobile device that has the smooth surface or touch screen is typically a hand held device but it can also be an article as part of, attached to or worn on a ring, bracelet necklace or earring because it is not necessary to look at the surface or touch screen to determine the time.

The mobile device may operate in coordination with application software running external to the hand-held or mobile device to carry out or provide the intended customization and ecommerce application. A computing device can include a computer, computer system or other programmable electronic device, including a client computer, a server computer, a portable computer (including a laptop and a tablet), a handheld computer, a mobile phone (including a smart phone), a gaming device, an embedded controller and any combination and/or equivalent thereof (including touchless devices). Moreover, the computing device may be implemented using one or more networked computers, e.g., in a cluster or other distributed computing system. It is understood that the exemplary environment discussed and illustrated is not intended to limit the present disclosure, and that other alternative hardware and/or software environments may be used without departing from the scope of this disclosure. The present techniques can be applied to devices other than hand-held devices, such as laptops or desktop computers.

For clarity, the terms "computing device", "computer device", "computer" and "machine" are understood to be interchangeable terms and shall be taken to include any collection of computing devices that individually or jointly execute a set (or multiple sets) of instructions to perform any one or more of the methods discussed herein.

The local storage can include volatile memory (such as RAM) and/or non-volatile memory (such as ROM as well as any supplemental levels of memory, including but not limited to cache memories, programmable or flash memories and read-only memories). The portable computing device or mobile device can include one or more processing devices (e.g., one or more central processing units (CPUs), one or more graphics processing units (GPUs), one or more microprocessors (µP) and similar and complementary devices) and optional media devices (e.g., a hard disk module, an optical disk module, etc.). Additionally, any storage techniques used in connection with the presently disclosed method and/or system may invariably be a combination of hardware and software.

In some instances, the term resident application is used to refer to an installed mobile application. However, as a matter of convenience mobile application and resident application are used interchangeably.

One or more features illustratively described herein can be implemented individually or in various combinations. The present system, method, or related inventions also relate to a non-transient computer readable medium configured to carry out any one of the methods disclosed herein. The application can be set of instructions readable by a processor and stored on the non-transient computer readable medium. Such medium may be permanent or semi-permanent memory, such as hard drive, floppy drive, optical disk, flash memory, ROM, EPROM, EEPROM, etc., as would be known to those of ordinary skill in the art. Features or characteristics described in one context, process, or device are applicable to other context, process or devices described herein. The steps of the processes illustratively described herein can be performed in a different order, if desired. Also, steps could be added or removed from the processes illustratively described herein. The processes illustratively described herein can be implemented using the described examples of hardware and network configurations.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A method that generates a tactile presentation which indicates time on a mobile device, which method comprises:
  providing a mobile device that is operated by a touch screen, with the touch screen including functionality to be able to be activated to electrovibrate in at least one portion thereof;
  receiving electrical signals specifying a current time on the touch screen; and
  generating electrovibrations that vary in response to the current time to provide haptic feedback to indicate a tactile presentation of the current time,
  wherein the electrovibrations are achieved by configuring the touch screen to include a glass plate that is topped with a transparent electrode and an insulator, so that when the insulator is contacted by a user's finger, electrical impulses are generated to provide the tactile presentation as haptic feedback to the user;

wherein the haptic feedback is configured to emulate shapes comprising either a numeric character in a predetermined location that represents elapsed minutes, or a discernable shape in a sector location disposed on a portion of the touch screen, with the haptic feedback of each shape being indicative of a particular grouping of a plurality of minutes, wherein 2 to 12 locations are provided to represent groupings of 30 to 5 minutes, respectively, so that a user by contacting the touch screen can sense the numeric character or shape generated by the haptic feedback and determine the time elapsed within an hour without having to view the touch screen.

2. The method of claim 1 further comprising haptic feedback in a further, different location which is indicative of a particular hour.

3. The method of claim 1 wherein the mobile device is a smartphone.

4. The method of claim 1 wherein the haptic feedback is configured to emulate the predetermined shape of a numeric character.

5. The method of claim 1 wherein the tactile presentation of the current time is displayed with respect to the orientation of phone.

6. The method of claim 1 wherein an application of pressure to the touch screen activates the tactile presentation of the current time.

7. The method of claim 1 wherein the current time that is provided by the tactile presentation on the touch screen is an indication of the hour and minutes of the day so that a user of the touch screen can determine the time of day in both hour and minutes without having to view the touch screen.

8. The method of claim 1 wherein the mobile device is a tablet computing device.

9. The method of claim 1 wherein a button is pressed to activate the tactile presentation of the current time.

10. The method of claim 1 wherein the hepatic feedback is configured to emulate a discernable shape in a sector location disposed on a portion of the touch screen.

11. The method of claim 1 wherein the haptic feedback is configured to emulate a discernable shape in a sector location disposed on a portion of the touch screen, wherein 2 to 4 locations are provided to represent groupings of 30 to 15 minutes.

12. A mobile device that generates a tactile presentation which indicates time, the device comprising:

a touch screen that includes functionality to be able to be activated to electrovibrate in at least one portion thereof and which is configured to include a glass plate that is topped with a transparent electrode and an insulator, the insulator being operable to receive contact from a user's finger and in response to the contact, generate electrical impulses to provide a tactile presentation as haptic feedback to the user;

a processor that receives electrical signals specifying a current time and displaying the time on the touch screen; and means for generating electrovibrations that vary in response to the current time to provide the tactile presentation of the current time on the touch screen;

wherein the haptic feedback is configured to emulate shapes comprising either a numeric character in a predetermined location that represents elapsed minutes, or a discernable shape in a sector location disposed on a portion of the touch screen, with the haptic feedback of each shape being indicative of a particular grouping of a plurality of minutes, wherein 2 to 12 sector locations are provided to represent groupings of 30 to 5 minutes, respectively, so that a user by contacting the touch screen can sense the numeric character or shape generated by the haptic feedback and determine the time elapsed within an hour without having to view the touch screen.

13. The device of claim 12 wherein the mobile device is a smartphone.

14. The device of claim 12 wherein the haptic feedback is configured to emulate the predetermined shape of a numeric character.

15. The device of claim 12 wherein the tactile presentation of the current time is displayed with respect to the orientation of device.

16. The device of claim 12 wherein an application of pressure to the touch screen activates the tactile presentation of the current time.

17. The device of claim 12 wherein the device further includes a button that activates the tactile presentation of the current time.

18. The device of claim 12 wherein the device is a tablet computing device.

19. The device of claim 12 wherein the haptic feedback is configured to emulate a discernable shape in a sector location disposed on a portion of the touch screen.

20. The device of claim 12 wherein the haptic feedback is configured to emulate a discernable shape in a sector location disposed on a portion of the touch screen, wherein 2 to 4 locations are provided to represent groupings of 30 to 15 minutes.

* * * * *

UNITED STATES PATENT AND TRADEMARK OFFICE
CERTIFICATE OF CORRECTION

| | | |
|---|---|---|
| PATENT NO. | : 9,454,229 B1 | Page 1 of 1 |
| APPLICATION NO. | : 14/225349 | |
| DATED | : September 27, 2016 | |
| INVENTOR(S) | : Wellen | |

It is certified that error appears in the above-identified patent and that said Letters Patent is hereby corrected as shown below:

In the Claims

Column 11:
Line 41 (claim 10, line 1), delete "hepatic" and insert -- haptic --.

Signed and Sealed this
Twenty-seventh Day of December, 2016

Michelle K. Lee
*Director of the United States Patent and Trademark Office*